United States Patent
Cocchi et al.

(10) Patent No.: US 7,530,108 B1
(45) Date of Patent: May 5, 2009

(54) MULTIPROCESSOR CONDITIONAL ACCESS MODULE AND METHOD FOR USING THE SAME

(75) Inventors: Ronald P. Cocchi, Seal Beach, CA (US); Christopher P. Curren, Brentwood, CA (US); Kevin T. Collier, Gardena, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 953 days.

(21) Appl. No.: 10/791,934

(22) Filed: Mar. 3, 2004

Related U.S. Application Data

(63) Continuation of application No. 10/662,499, filed on Sep. 15, 2003, now abandoned.

(51) Int. Cl.
G06F 21/02 (2006.01)

(52) U.S. Cl. .................. 726/26; 726/27; 726/29; 713/194; 380/200; 380/210; 380/231

(58) Field of Classification Search .............. 380/28, 380/200, 210, 223, 225, 231; 726/26, 27, 726/29
See application file for complete search history.

(56) References Cited

U.S. PATENT DOCUMENTS

| | | | |
|---|---|---|---|
| 4,672,535 A | 6/1987 | Katzman et al. | |
| 4,939,643 A | 7/1990 | Long et al. | |
| 5,148,481 A | 9/1992 | Abraham et al. | |
| 5,471,586 A | 11/1995 | Sefidvash et al. | |
| 5,491,827 A | 2/1996 | Holtey | |
| 5,751,955 A | 5/1998 | Sonnier et al. | |
| 5,790,776 A | 8/1998 | Sonnier et al. | |
| 5,912,453 A * | 6/1999 | Gungl et al. | 235/492 |
| 6,064,739 A * | 5/2000 | Davis | 380/200 |
| 6,151,689 A | 11/2000 | Garcia et al. | |
| 6,160,734 A | 12/2000 | Henderson et al. | |
| 6,163,721 A * | 12/2000 | Thompson | 607/2 |
| 6,182,205 B1 | 1/2001 | Le Roux et al. | |
| 6,209,098 B1 | 3/2001 | Davis | |
| 6,233,683 B1 | 5/2001 | Chan et al. | |
| 6,357,009 B1 | 3/2002 | Giles et al. | |
| 6,496,940 B1 | 12/2002 | Horst et al. | |
| 6,907,123 B1 * | 6/2005 | Schier | 380/28 |
| 7,162,034 B1 * | 1/2007 | Joly et al. | 380/37 |
| 2001/0037438 A1 | 11/2001 | Mathis | |
| 2002/0094084 A1 * | 7/2002 | Wasilewski et al. | 380/241 |
| 2003/0110154 A1 * | 6/2003 | Ishihara et al. | 707/1 |
| 2005/0005149 A1 | 1/2005 | Hirota et al. | |

* cited by examiner

*Primary Examiner*—Kimyen Vu
*Assistant Examiner*—Edward Zee

(57) ABSTRACT

A system and method of controlling access to a media program via a receiver communicably coupleable to a conditional access module is described. The apparatus comprises a first processor, a second processor, and an interface module, communicatively coupled to the first processor and the second processor, the interface module for processing all communications with the conditional access module and externally manifesting a single virtual processor to the receiver.

21 Claims, 8 Drawing Sheets

MULTIPROCESSOR CONDITIONAL ACCESS MODULE AND METHOD FOR USING THE SAME

This application is a continuation application of Ser. No. 10/662,499, filed on Sep. 15, 2003, now abandoned for MULTIPROCESSOR CONDITIONAL ACCESS MODULE AND METHOD FOR USING SAME, Ronald P. Cocchi et al.

BACKGROUND OF THE INVENTION

1. Field of the Invention

The present invention relates to systems and methods for preventing unauthorized reception of media programs and in particular to a method and apparatus for verifying the contents of a memory storing instructions for granting access to such memory programs.

2. Description of the Related Art

One method to assure the security of the media programs broadcast over such systems is through the use of a conditional access module (CAM) removably coupled to the media program receiver. The media programs are transmitted and received in encrypted form, and a decryption engine disposed in the CAM is used to decrypt such media programs so that they can be presented to the viewer. CAMs typically include a microprocessor, a memory storing microprocessor instructions, and an input/output (I/O) module.

If the encryption operations in the CAM are compromised, unauthorized access to the media programs may result. One of the simplest and most prevalent form of attack against microcontroller components uses external means using the system input/output interface. This can reveal the contents of the microprocessor memory, exposing it's secure data or functionality. This information can be used to determine and ultimately subvert or bypass important microprocessor functions.

What is needed is a system and method that increases the difficulty of such attacks, reduces the probability that such attacks will ultimately prove successful, and to limit the general applicability of any information derived from such attacks. The present invention satisfies that need.

SUMMARY OF THE INVENTION

In summary, the present invention describes a system and method of controlling access to a media program via a receiver communicably coupleable to the conditional access module. The apparatus comprises a first processor, a second processor, and an interface module, communicatively coupled to the first processor and the second processor, the interface module for processing all communications with the conditional access module and externally manifesting a single virtual processor to the receiver. One embodiment of the method is described by the steps of receiving a message in a conditional access module from a receiver, the message comprising encrypted information to be decrypted by operations independently performed by a both a first processor and a second processor in the conditional access module, generating first processor commands and second processor commands from the message, providing the first processor commands to the first processor and the second processor commands to the second processor, receiving a first processor response from the first processor, receiving a second processor response from the second processor, and generating a conditional access message response from at least a portion of the first processor response and the second processor response.

The simplest and most common form of attack against microcontroller components uses external means using the system input/output interface due to the low cost of the equipment required to implement this form of attack.

The CAM includes an interface module and multiple processor that reside behind the interface module. The interface module reduces the ability to determine the functionality of the CAM by external means.

The multiple processor design allows each processor to have its own nonvolatile memory containing information used to provide the desired functionality and enforce security policies. The interface module sends and receives messages between the set-top box or receiver and the separate processors. The interface module therefore becomes the first line of defense against external attacks and complicates invasive, internal attacks though addition of a custom logic block or separate processor.

The interface module communicates with the outside environment, i.e. set-top box or receiver, as if there were only one processor. Multiple responses are received in response to the interface module delivering access request messages. The interface module combines the result calculated independently by each processor to determine the single result used to gain access to the requested service. This result is delivered to the set-top box.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which show, by way of illustration, several embodiments of the present invention. It is understood that other embodiments may be utilized and structural changes may be made without departing from the scope of the present invention.

Figure 1:
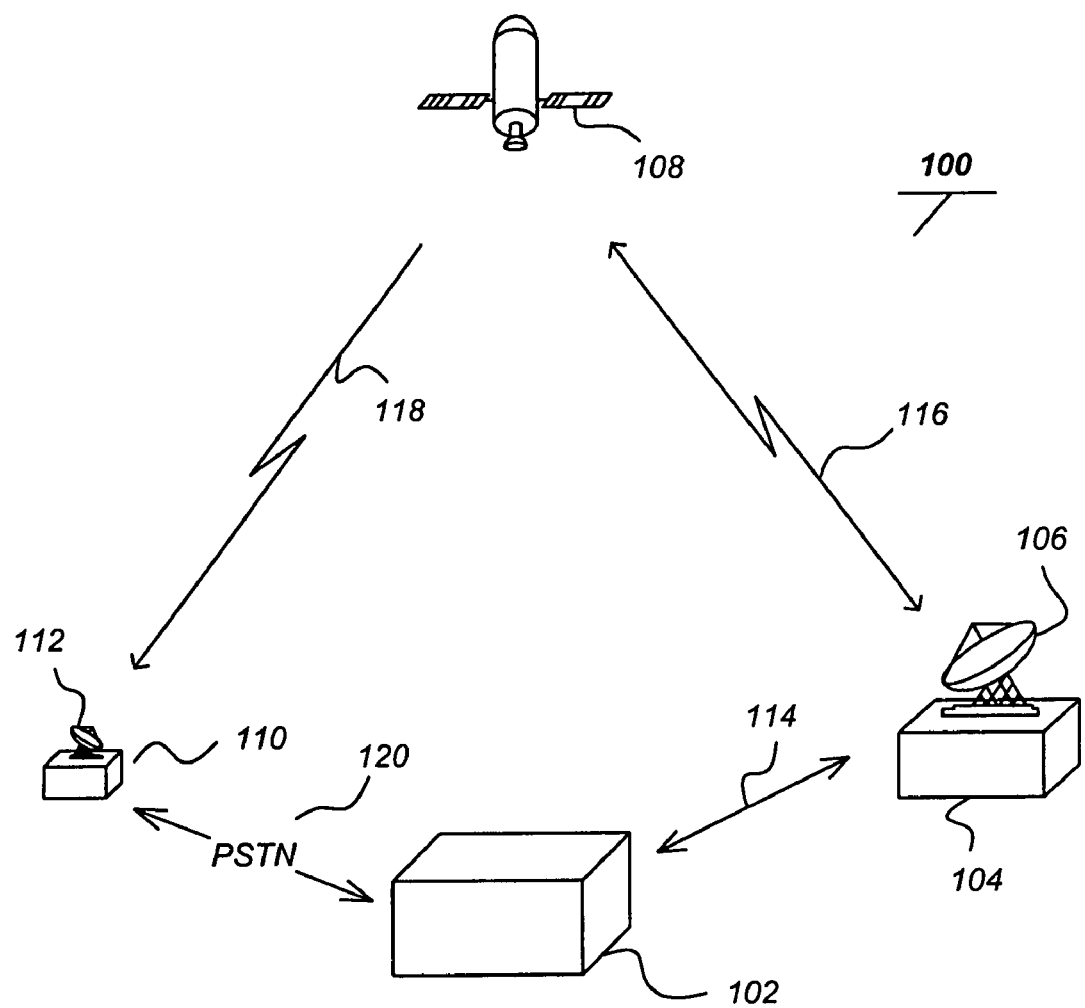
FIG. 1 is a diagram showing an overview of a video distribution system.

FIG. 1 is a diagram illustrating an overview of a video distribution system 100. The video distribution system 100 comprises a control center 102 in communication with an uplink center 104 via a ground link 114 and with a subscriber 110 via a public switched telephone network (PSTN) or other link 120. The control center 102 provides program material to the uplink center 104, coordinates with the subscribers 110 to offer pay-per-view (PPV) program services, including billing and associated decryption of video programs.

The uplink center receives program material and program control information from the control center 102, and using an uplink antenna 106, transmits the program material and program control information to the satellite 108 via uplink 116. The satellite receives and processes this information, and transmits the video programs and control information to the subscriber via downlink 118. The subscriber 110 receives this information using the subscriber antenna 112.

In one embodiment, the subscriber antenna 112 is an 18-inch slightly oval-shaped Ku-band antenna. The slight oval shape is due to the 22.5 degree offset feed of the LNB (low noise block converter) which is used to receive signals reflected from the subscriber antenna 112. The offset feed positions the LNB out of the way so it does not block any surface area of the antenna 112 minimizing attenuation of the incoming microwave signal.

The video distribution system 100 can comprise a plurality of satellites 108 in order to provide wider terrestrial coverage, to provide additional channels, or to provide additional bandwidth per channel. In one embodiment of the invention, each satellite comprises 16 transponders to receive and transmit program material and other control data from the uplink center 104 and provide it to the subscribers 110. However, using data compression and multiplexing techniques the channel capabilities are far greater. For example, two-satellites 108 working together can receive and broadcast over 150 conventional (non-HDTV) audio and video channels via 32 transponders.

While the invention disclosed herein will be described with reference to a satellite based video distribution system 100, the present invention may also be practiced with terrestrial-based transmission of program information, whether by broadcasting means, cable, or other means. Further, the different functions collectively allocated among the control center 102 and the uplink center 104 as described above can be reallocated as desired without departing from the intended scope of the present invention.

Although the foregoing has been described with respect to an embodiment in which the program material delivered to the subscriber is video (and audio) program material such as a movie, the foregoing method can be used to deliver program material comprising purely audio information as well.

Figure 2:
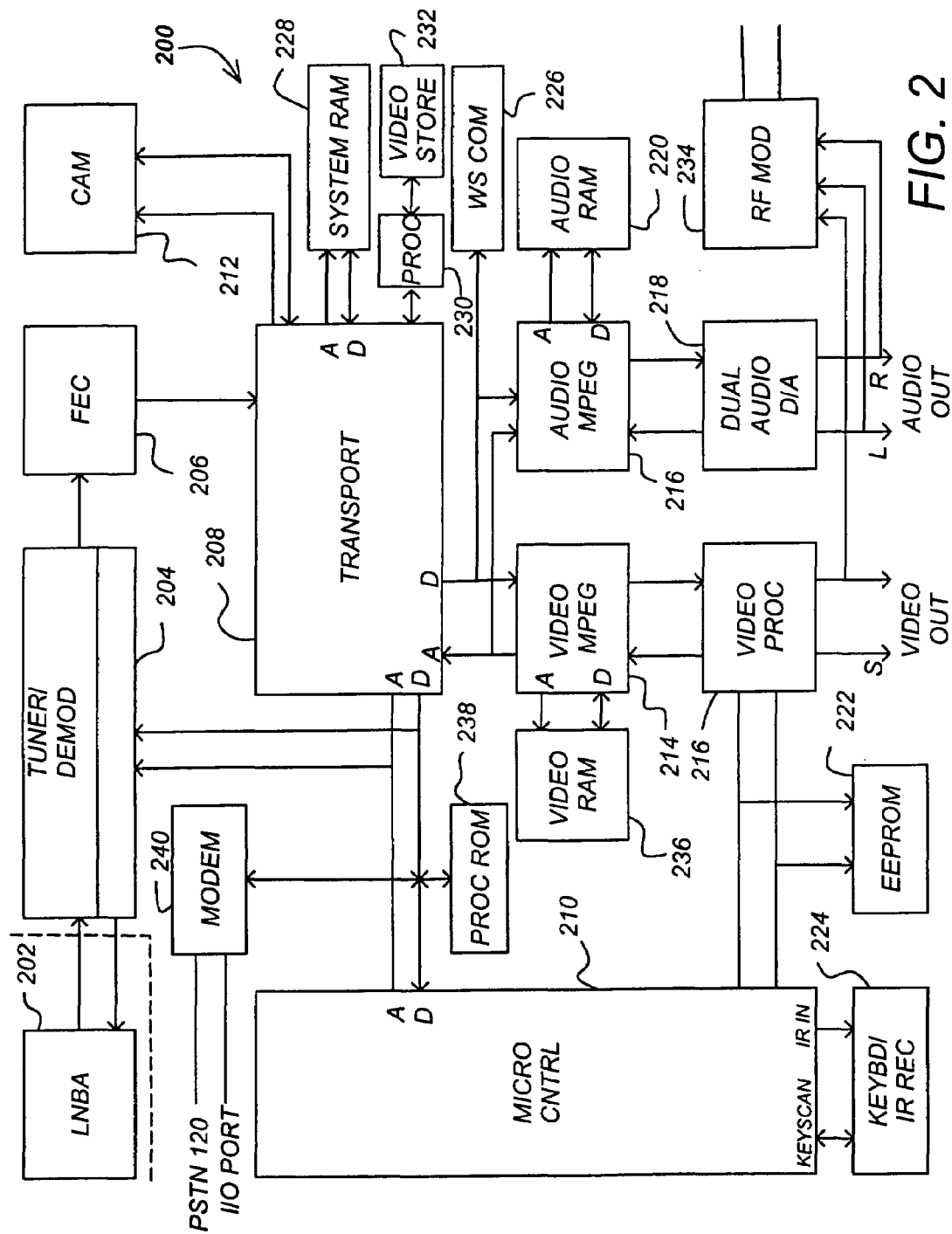
FIG. 2 is a block diagram of an integrated receiver/decoder for practicing the present invention.

FIG. 2 is a block diagram of an integrated receiver/decoder (IRD) 200 (also hereinafter alternatively referred to as receiver 200). The receiver 200 comprises a tuner/demodulator 204 communicatively coupled to the LNB 202. The LNB 202 converts the 12.2- to 12.7 GHz downlink 118 signal from the satellites 108 to, e.g., a 950-1450 MHz signal required by the receiver's 200 tuner/demodulator 204. The LNB 202 may provide either a dual or a single output. The single-output LNB 202 has only one RF connector, while the dual output LNB 202 has two RF output connectors and can be used to feed a second receiver or some other form of distribution system.

The tuner/demodulator 204 isolates a single, digitally modulated 24 MHz transponder, and converts the modulated data to a digital data stream. The digital data stream is then supplied to a forward error correction (FEC) decoder 206. This allows the receiver 200 to reassemble the data transmitted by the uplink center 104 (which applied the forward error correction to the desired signal before transmission to the subscriber 110) verify that the correct data signal was received, and correct errors, if any. The error-corrected data may be fed from the FEC decoder module 206 to the transport module via an 8-bit parallel interface.

The transport module 208 performs many of the data processing functions performed by the receiver 200. The transport module 208 processes data received from the FEC decoder module 206 and provides the processed data to the video MPEG decoder 214 and the audio MPEG decoder 216. In one embodiment of the present invention, the transport module, video MPEG decoder and audio MPEG decoder are all implemented on integrated circuits. This design promotes both space and power efficiency, and increases the security of the functions performed within the transport module 208. The transport module 208 also provides a passage for communications between the microcontroller 210 and the video and audio MPEG decoders 214, 216. As set forth more fully hereinafter, the transport module also works with the CAM 212 to determine whether the subscriber 110 is permitted to access certain program material. Data from the transport module can also be supplied to external communication module 226. The operations performed by the transport module are further illustrated and described with respect to FIG. 3.

The CAM 212 functions in association with other elements to decode an encrypted signal from the transport module 208. The CAM 212 may also be used for tracking and billing these services. In one embodiment of the present invention, the CAM 212 is a smart card, having contacts cooperatively interacting with contacts in the receiver 200 to pass information. In order to implement the processing performed in the CAM 212, the receiver 200, and specifically the transport module 208 provides a clock signal to the CAM 212.

Video data is processed by the MPEG video decoder 214. Using the video random access memory (RAM) 236, the MPEG video decoder 214 decodes the compressed video data and sends it to an encoder or video processor 216, which converts the digital video information received from the video MPEG module 214 into an output signal usable by a display or other output device. By way of example, processor 216 may comprise a National TV Standards Committee (NTSC) or Advanced Television Systems Committee (ATSC) encoder. In one embodiment of the invention both S-Video and ordinary video (NTSC or ATSC) signals are provided. Other outputs may also be utilized, and are advantageous if ATSC high definition programming is processed.

Audio data is likewise decoded by the MPEG audio decoder 216. The decoded audio data may then be sent to a digital to analog (D/A) converter 218. In one embodiment of the present invention, the D/A converter 218 is a dual D/A converter, one for the right and left channels. If desired, additional channels can be added for use in surround sound processing or secondary audio programs (SAPs). In one embodiment of the invention, the dual D/A converter 218 itself separates the left and right channel information, as well as any additional channel information. Other audio formats may similarly be supported. For example multi-channel digital audio formats, such as DOLBY DIGITAL AC-3 may be used.

A description of the processes performed in the encoding and decoding of video streams, particularly with respect to MPEG and JPEG encoding/decoding, can be found in Chapter 8 of "Digital Television Fundamentals," by Michael Robin and Michel Poulin, McGraw-Hill, 1998, which is hereby incorporated by reference herein.

Microcontroller 210 receives and processes command signals from the remote control 224, a receiver 200 keyboard interface, and/or another input device. The microcontroller receives commands for performing its operations from a processor programming memory, which permanently stores such instructions for performing such commands. The processor programming memory may comprise a read only memory (ROM) 238, an electrically erasable programmable read only memory (EEPROM) or, similar memory device. The microcontroller 210 also controls the other digital devices of the receiver 200 via address and data lines (denoted "A" and "D" respectively, in FIG. 2).

The modem 240 connects to the customer's phone line via the PSTN port 120. It calls, e.g., the program provider and transmits the customer's program purchases for billing purposes, and/or other information. The modem 240 is controlled by the microprocessor 210. The modem 240 can output data to other I/O port types including standard parallel and serial computer I/O ports.

The present invention also comprises a local storage unit such as the video storage device 232 for storing video and/or audio data obtained from the transport module 208. Video storage device 232 can be a hard disk drive, a read/writeable compact disc of DVD, a solid state RAM, or any other storage medium. In one embodiment of the present invention, the video storage device 232 is a hard disk drive with specialized parallel read/write capability so that data may be read from the video storage device 232 and written to the device 232 at the same time. To accomplish this feat, additional buffer memory accessible by the video storage 232 or its controller may be used. Optionally, a video storage processor 230 can be used to manage the storage and retrieval of the video data from the video storage device 232. The video storage processor 230 may also comprise memory for buffering data passing into and out of the video storage device 232. Alternatively or in combination with the foregoing, a plurality of video storage devices 232 can be used. Also alternatively or in combination with the foregoing, the microcontroller 210 can also perform the operations required to store and/or retrieve video and other data in the video storage device 232.

The video processing module 216 output can be directly supplied as a video output to a viewing device such as a video or computer monitor. In addition the video and/or audio outputs can be supplied to an RF modulator 234 to produce an RF output and/or 8 vestigal side band (VSB) suitable as an input signal to a conventional television tuner. This allows the receiver 200 to operate with televisions without a video output.

Each of the satellites 108 comprises a transponder, which accepts program information from the uplink center 104, and relays this information to the subscriber 110. Known multiplexing techniques are used so that multiple channels can be provided to the user. These multiplexing techniques include, by way of example, various statistical or other time domain multiplexing techniques and polarization multiplexing. In one embodiment of the invention, a single transponder operating at a single frequency band carries a plurality of channels identified by respective service channel identification (SCID).

Preferably, the receiver 200 also receives and stores a program guide in a memory available to the microcontroller 210. Typically, the program guide is received in one or more data packets in the data stream from the satellite 108. The program guide can be accessed and searched by the execution of suitable operation steps implemented by the microcontroller 210 and stored in the processor ROM 238. The program guide may include data to map the channel numbers to satellite transponders and service channel identifications (SCIDs), and also provide TV program listing information to the subscriber identifying program events.

Figure 3:
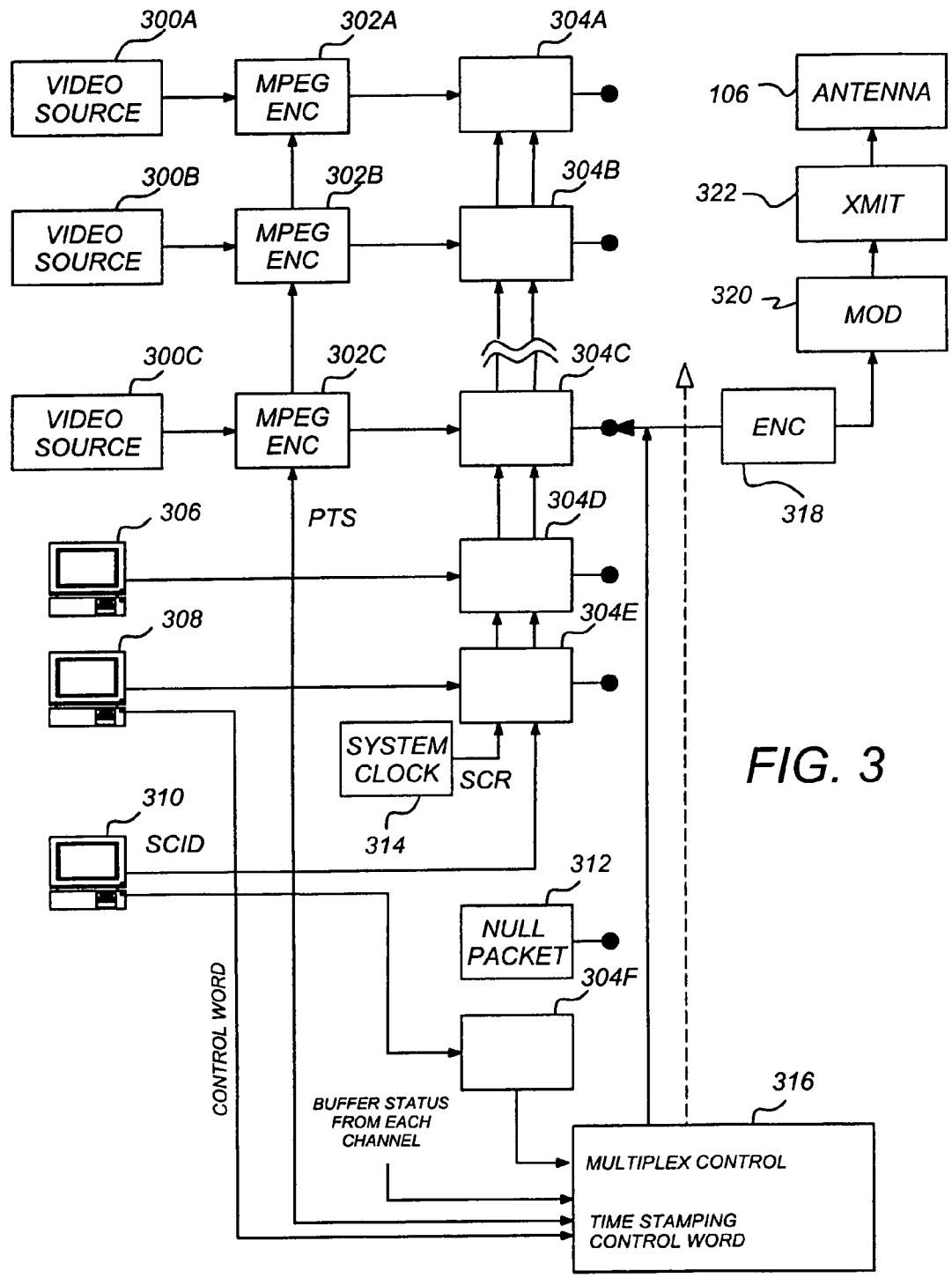
FIG. 3 is a block diagram showing a typical uplink configuration showing how video program material is uplinked to a satellite for transmission to subscribers using a single transponder.

FIG. 3 is a block diagram showing a typical uplink configuration for a single satellite 108 transponder, showing how video program material is uplinked to the satellite 108 by the control center 102 and the uplink center 104. FIG. 3 shows three video channels (which could be augmented respectively with one or more audio channels for high fidelity music, soundtrack information, or a secondary audio program for transmitting foreign languages), and a data channel from a computer data source 306.

The video channels are provided by a program source of video material 300A-300C (collectively referred to hereinafter as video source(s) 300). The data from each video program source 300 is provided to an encoder 302A-302C (collectively referred to hereinafter as encoder(s) 302). Each of the encoders accepts a program time stamp (PTS) from the controller 316. The PTS is a wrap-around binary time stamp that is used to assure that the video information is properly synchronized with the audio information after encoding and decoding. A PTS time stamp is sent with each I-frame of the MPEG encoded data.

In one embodiment of the present invention, each encoder 302 is a second generation Motion Picture Experts Group (MPEG-2) encoder, but other decoders implementing other coding techniques can be used as well. The data channel can be subjected to a similar compression scheme by an encoder (not shown), but such compression is usually either unnecessary, or performed by computer programs in the computer data source (for example, photographic data is typically compressed into *.TIF files or *.JPG files before transmission). After encoding by the encoders 302, the signals are converted into data packets by a packetizer 304A-304F (collectively referred to hereinafter as packetizer(s) 304) associated with each source 300.

The data packets are assembled using a reference from the system clock 314 (SCR), and from the conditional access manager 308, which provides the SCID to the packetizers 304 for use in generating the data packets. These data packets are then multiplexed into serial data and transmitted.

Figure 4A:
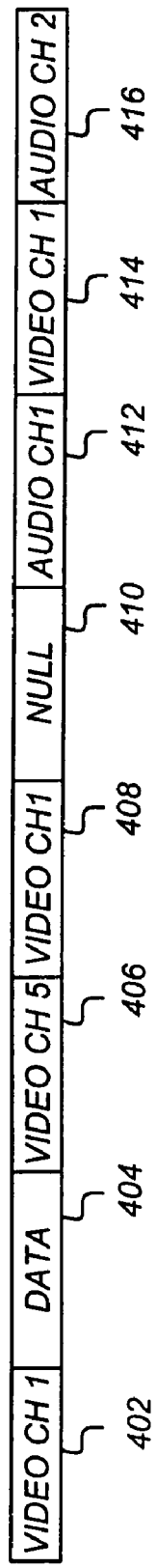
FIG. 4A is a diagram of a representative data stream received from a satellite.

FIG. 4A is a diagram of a representative data stream. The first packet segment 402 comprises information from video channel 1 (data coming from, for example, the first video program source 300A). The next packet segment 404 comprises computer data information that was obtained, for example from the computer data source 306. The next packet segment 406 comprises information from video channel 5 (from one of the video program sources 300), and the next packet segment includes information from video channel 1 (again, coming from the first video program source 300A). The data stream therefore comprises a series of packets from any one of the data sources in an order determined by the controller 316. The data stream is encrypted by the encryption module 318, modulated by the modulator 320 (typically using a QPSK modulation scheme), and provided to the transmitter 322, which broadcasts the modulated data stream on a frequency bandwidth to the satellite via the antenna 106. The receiver 200 receives these signals, and using the SCID, reassembles the packets to regenerate the program material for each of the channels. As shown in FIG. 4A, null packets created by the null packet module 312 may be inserted into the data stream as desired.

Figure 4B:
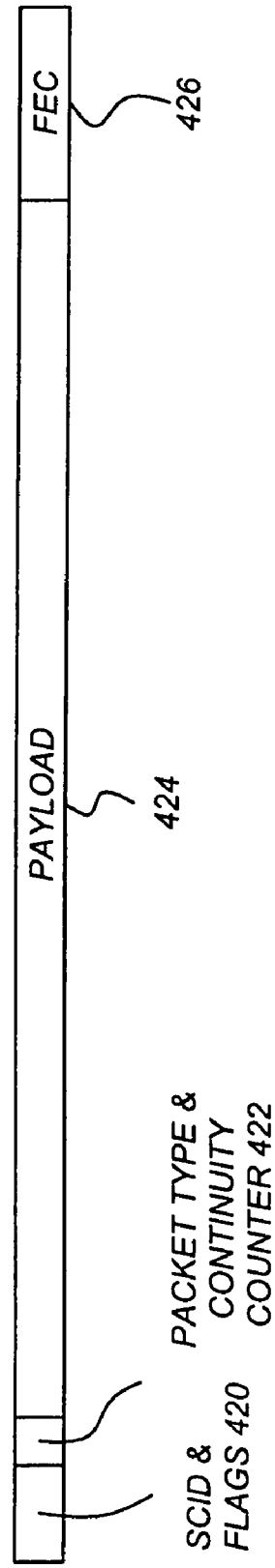
FIG. 4B is a diagram illustrating the structure of a data packet.

FIG. 4B is a diagram of a data packet. Each data packet (e.g. 402-416) is 147 bytes long, and comprises a number of packet segments. The first packet segment 420 comprises two bytes of information containing the SCID and flags. The SCID is a unique 12-bit number that uniquely identifies the data packet's data channel. The flags include 4 bits that are used to control whether the packet is encrypted, and what key must be used to decrypt the packet. The second packet segment 422 is made up of a 4-bit packet type indicator and a 4-bit continuity counter. The packet type identifies the packet as one of the four data types (video, audio, data, or null).

When combined with the SCID, the packet type determines how the data packet will be used. The continuity counter increments once for each packet type and SCID. The next packet segment 424 comprises 127 bytes of payload data, which is a portion of the video program provided by the video program source 300. The final packet segment 426 is data required to perform forward error correction.

Figure 5:
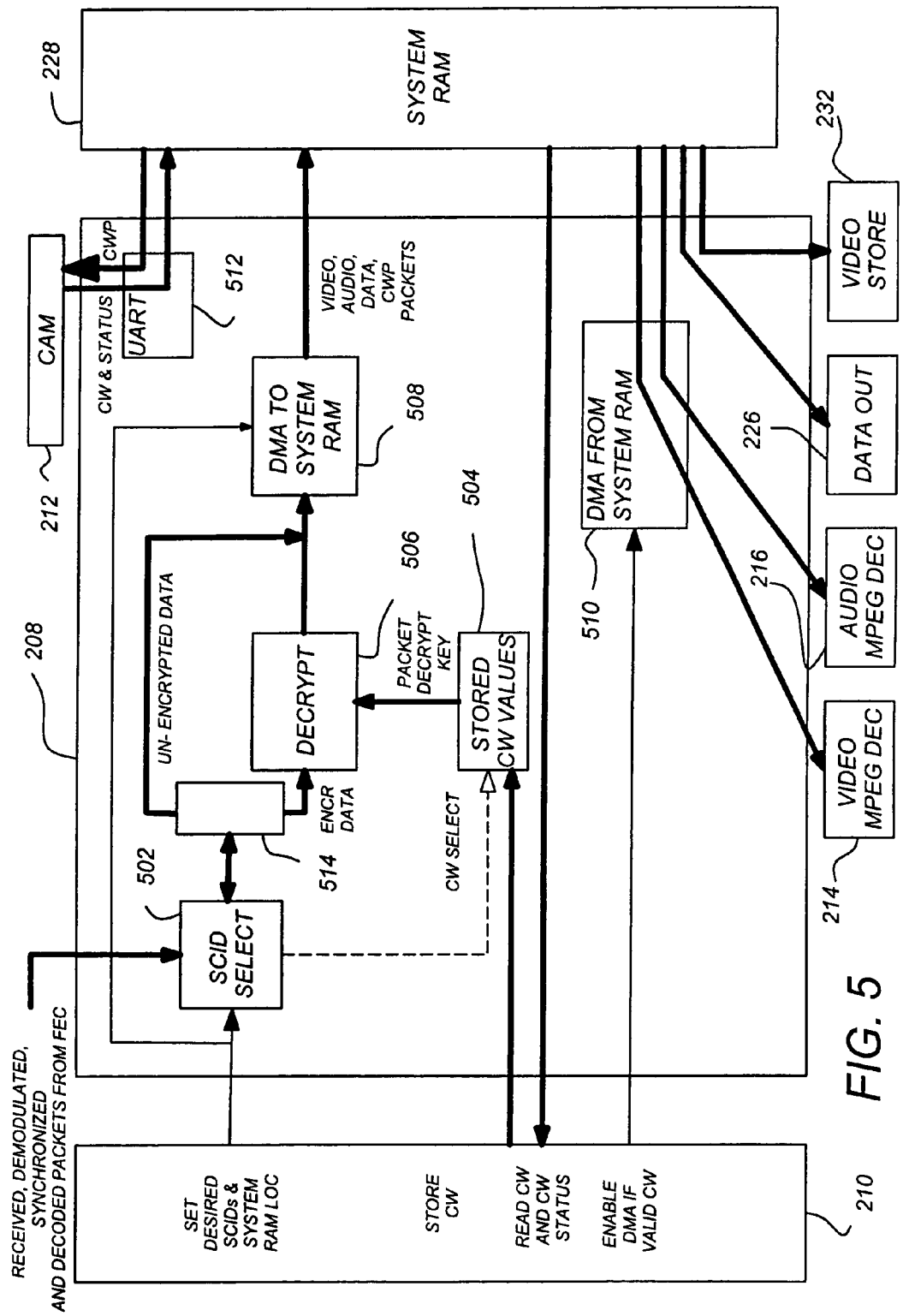
FIG. 5 is a block diagram illustrating transport module functions.

FIG. 5 is a block diagram showing additional detail regarding the operations of the transport module. The data packets which are received, demodulated, synchronized and reverse FEC coded from the FEC module 206 are provided to a demultiplexer such as the SCID select module 502. Program selection information is processed by the microcontroller 210, and used to select the one or more SCIDs associated with the desired program (a program may be separated into several streams, each with an associated SCID).

The SCID select module compares the selected SCID or SCIDs with the SCIDs for the incoming packets, and passes those packets with SCIDs matching the selected channel(s). For single channel service, non-selected packets (packets without the subscriber-selected SCID) are simply discarded.

In the typical case where a video program comprises multiple stream elements, the SCID select module 502 passes the required packets. If more than one channel is desired (e.g. to allow the reception and recording multiple channels at a time while simultaneously viewing them) the SCID select module 502 passes these to the stream elements for the additional channels as well.

In the preferred embodiment, all program material is encrypted. For viewing encrypted programming, the receiver 200 is responsible for verifying that access should be granted, and if so, decrypting the data packets so the program material can be viewed by the subscriber. For unencrypted programming, the data router 514 directs the data packets directly in the system RAM 228 via DMA 508.

Each data packet is associated with a control word packet (CWP) that is received by the transport module 208. The CWP encodes each program to prevent tampering, and is used by the CAM 212 to generate a CW and a CW status, which are stored in the CW memory 504. The CW is used to enable data packets to be retrieved from the system RAM 228 and provided to the video MPEG decoder 214 and/or audio MPEG decoder 216, and may also be used to decrypt the data packet itself.

Encrypted data packets must be decrypted before presentation to the user. This is accomplished by routing encrypted data packets to the decrypt module 506. These encrypted data packets are then decrypted and stored in the system RAM 228 for DMA access by the MPEG decoders 214, 216.

In one embodiment, the decryption process is accomplished as follows. In response to a user demand and while retrieving the stored first segment for presentation to the user, a message is transmitted to the IRD 200 separately identifying each of the subsequent segments of the selected video program and the user to the program source such as the control center 102 or the uplink center 104. A code or key such as the package information parcel (PIP) is then received by the IRD 200. The key is later used to decrypt the encrypted segments so the video program can be viewed by the user.

In another embodiment, a message is transmitted to the IRD 200 separately identifying each of the subsequent segments of the selected video program and the user to the program source such as the control center 102 or the uplink center 104. In response, a plurality of codes or keys are transmitted and received by the IRD 200, and each of the keys is used to decrypt an associated one of the encrypted subsequent segments.

Figure 6A:
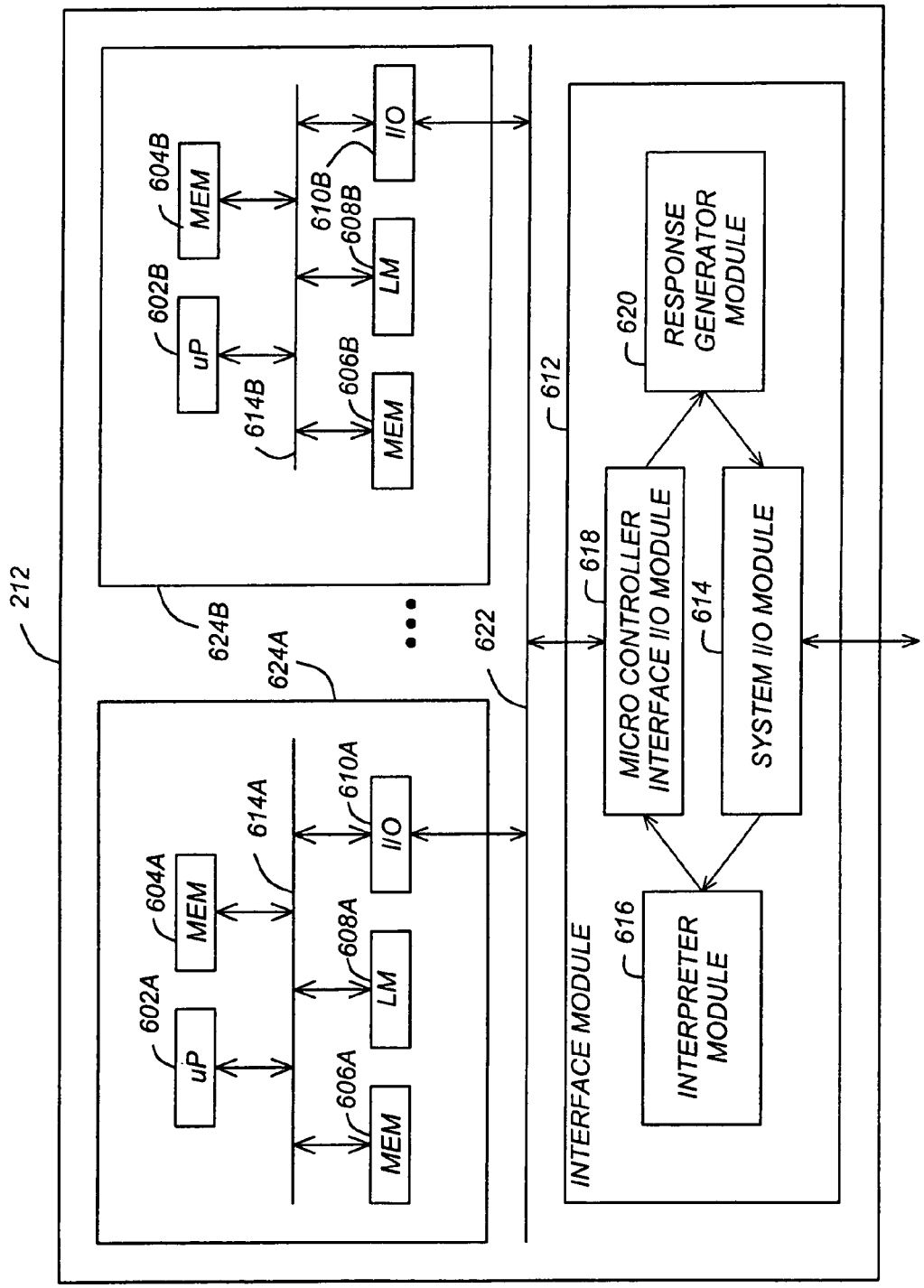
FIGS. 6A and 6B are diagrams depicting multi-processor embodiments of the present invention.

FIG. 6A is a diagram depicting one embodiment of the CAM 212. In this embodiment, the CAM 212 comprises a first microcontroller 624A and a second microcontroller 624B and an interface module 612.

The first microcontroller 624A includes a first microprocessor 602A, a first memory 604A, a second memory 606A, a logical module 608A and an I/O module 610A. Each of these elements are communicatively coupled via a bus 616A. The I/O module 610A accepts and, if necessary, interprets those commands and data and provides them to the bus 616A, where they can be distributed to the other elements 602A-608A of the first microcontroller 624A. In one embodiment, the first memory 604A is a volatile memory for storing temporary data and instructions used by the first microprocessor 602A. Such temporary data and instructions are lost when power is removed from the CAM 212. In one embodiment, the volatile memory 604A comprises a random access memory (RAM). In one embodiment, the second memory 606A stores program instructions and other data that are used by the microprocessor 602A to perform CAM functions. Since microprocessor 602A function-implementing instructions are stored in the second memory 606A, the second memory 606A typically comprises a non-volatile memory 606A that retains the contents of the memory 606A even in the absence of power. The second microcontroller 624B includes elements analogous to those of the first microprocessor 624A, including a second processor 602B.

The interface module 612 processes all communications between the transport module 208 and the CAM 212, and externally manifests a single virtual processor to the transport module 208 and hence, the IRD 200. The interface module 612 may comprise a microprocessor, or a hardware state machine. The first microprocessor 602A performs a subset of the operations required to control access to media programs, and the second processor performs a second and at least partially independent subset of these operations.

The system I/O module 614 receives messages from the transport module 208 of the IRD 200, and passes these messages to an interpreter module 616. The interpreter module 616 parses out the message received from the system I/O module 614, and using the message received from the system I/O module 614, generates one or more messages that are set to the first processor 602A and one or more messages that are sent to the second processor 602B via the microcontroller interface I/O module 618, the microcontroller I/O modules 610A and 610B, and the microcontroller busses 614A and 614B.

The microprocessors 602A and 602B generate response messages that are transmitted to the response generator module 620 via the microcontroller busses 614A and 614B, the microcontroller I/O modules 610A and 610B, the system bus 622 and the microcontroller interface I/O module 618. The response generator module 620 generates a conditional access module response message from the response messages received from microprocessors 602A and 602B.

These messages passing to and from the microprocessors 602A and 602B can include different combinations of commands and data. For example, a message received from the transport module 208 can include the contents of a control word packet and a clock value. The decryption of that control word packet may require the generation of two encryption keys, and the generation of those keys can take place in the first microprocessor 602A and the second microprocessor 602B separately. In this case, the interpreter module 616 uses the control word data received from the system I/O module 614 to generate two messages, each with the appropriate commands and data, and transmits these messages to the appropriate microcontroller 602A, 602B. The microcontrollers 602A and 602B generate response messages having data and/or commands (which can be the two keys), and transmits those response messages to the response generator module 620 via the microcontroller interface I/O module 618. The response generator module 620 receives the response messages and generates a conditional access module response message using at least a portion of the response messages from each of the microcontrollers 602A and 602B. In the example described above, the response may include a concatenated version of the encryption keys, or another form of the responses received from the first microprocessor 602A and the second microprocessor 602B. The conditional access module response message is provided to the system I/O module 614 and thence to the transport module 208.

Also, the message received from the transport module 208 can include a control word packet that includes information that is double encrypted (encrypted according to a first key and encrypted again according to a second key). In this case, the first microprocessor 602A can be used to partially decrypt the control word (e.g. to a first encryption level), and the second microprocessor 602B can be used to further decrypt the partially decrypted control word, thus producing the control word that is provided to the transport module 208 to decrypt the media program. In this embodiment, the results of the computation of the first microprocessor 602A (the partially decrypted control word) can be provided directly from the first microprocessor 602A to the second microprocessor 602B via system bus 622, or can be provided to the second microprocessor 602B via the interface module 612. In this embodiment, the interface module 612 operates like a master controller, coordinating and combining the computations that must be performed by the first microprocessor 602A and the second microprocessor 602B, whether such operations be performed in serially or in parallel. The interface module 612 may also schedule computations to be alternately and independently performed by the first microprocessor 602A and the second microprocessor 602B.

In yet another embodiment, the interface module 612 has an inherently defined set of functions that are allocated to one microprocessor or the other. For example, all multiplication functions may be allocated to the first microprocessor 602A, and all addition functions to the second microprocessor 602B. To render the CAM 212 even more resistant to compromise, the functional allocation between the first microprocessor 602A and the second microprocessor 602B can be timevarying. This can be accomplished by making the functional allocation dependent on the clock information provided by the transport module 208, on information that was previously decrypted by the CAM 212, or on information inside the CWP itself.

In the illustrated embodiment, each microprocessor 604A, 604B includes its own volatile memory 604A, 604B, non-volatile memory 606A, 606B, logical module 608A, 608B, thus collectively implementing a first microcontroller 624A and a second microcontroller 624B. However, the present invention can be practiced with separate microprocessors 604A, 604B and share other microcontroller elements. Further, each microprocessor may be provided with a separate power supply, and clock, if desired. The first microprocessor 604A and the second microprocessor 604B may share logical and/or physical address ranges, but preferably, each microprocessor 604A, 604B has separate logical and/or physical address ranges. Each of the logical modules 608A, 608B may include the independent memory-read and evaluation capability described above, if desired. Finally, although two microprocessors 604A, 604B are depicted in FIG. 6A, the present invention can be implemented with any number of a plurality of microprocessors 604, as desired for each particular application.

Figure 6B:
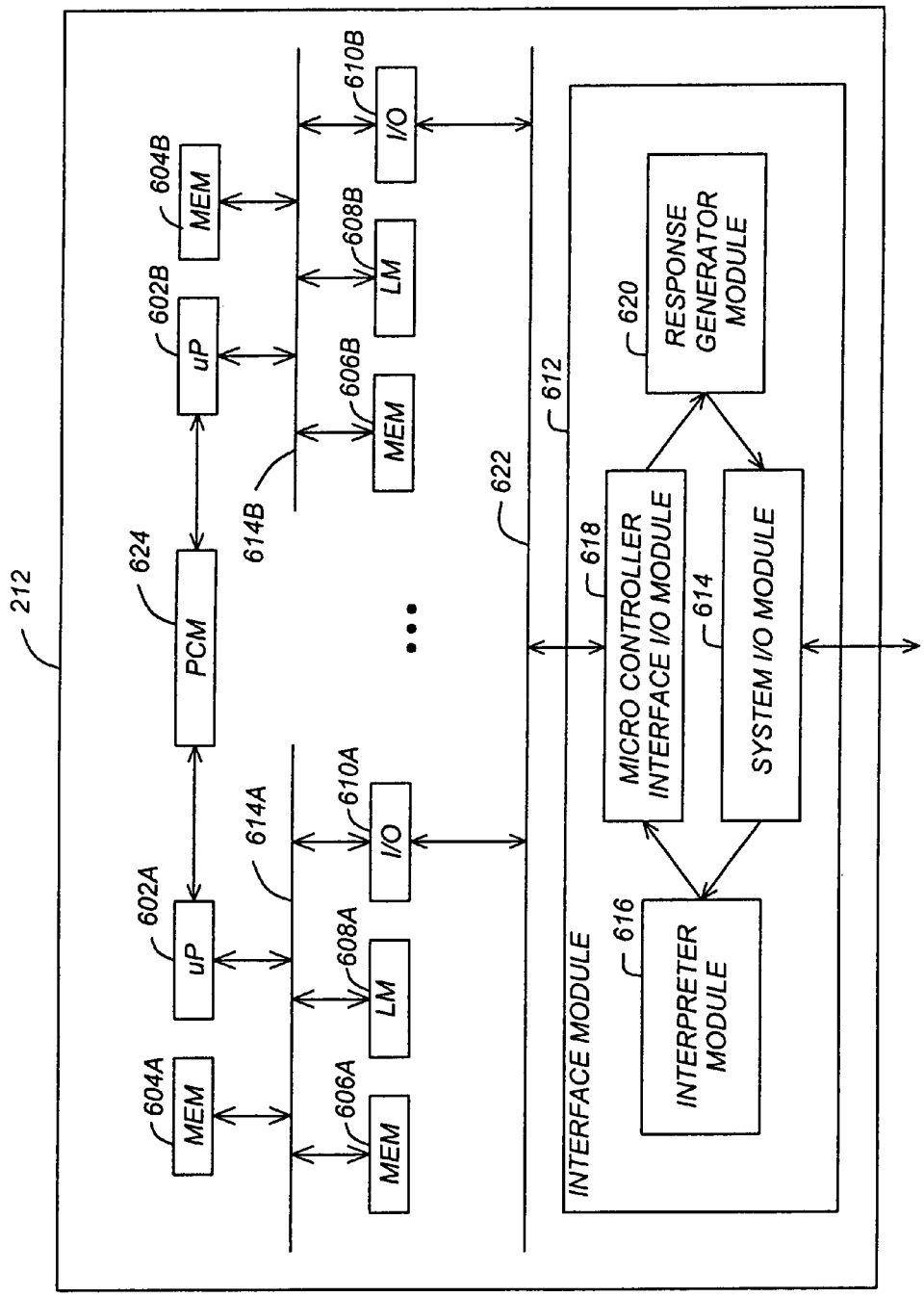

FIG. 6B is a block diagram of another embodiment of the invention in which the first and second processors 604A, 604B share a programming control module (PCM) 624. The PCM 624 synchronizes common data stored in the first processor 602A and the second processor 602B. The first and second processors 602A, 602B may also share charge pumps.

Figure 7:
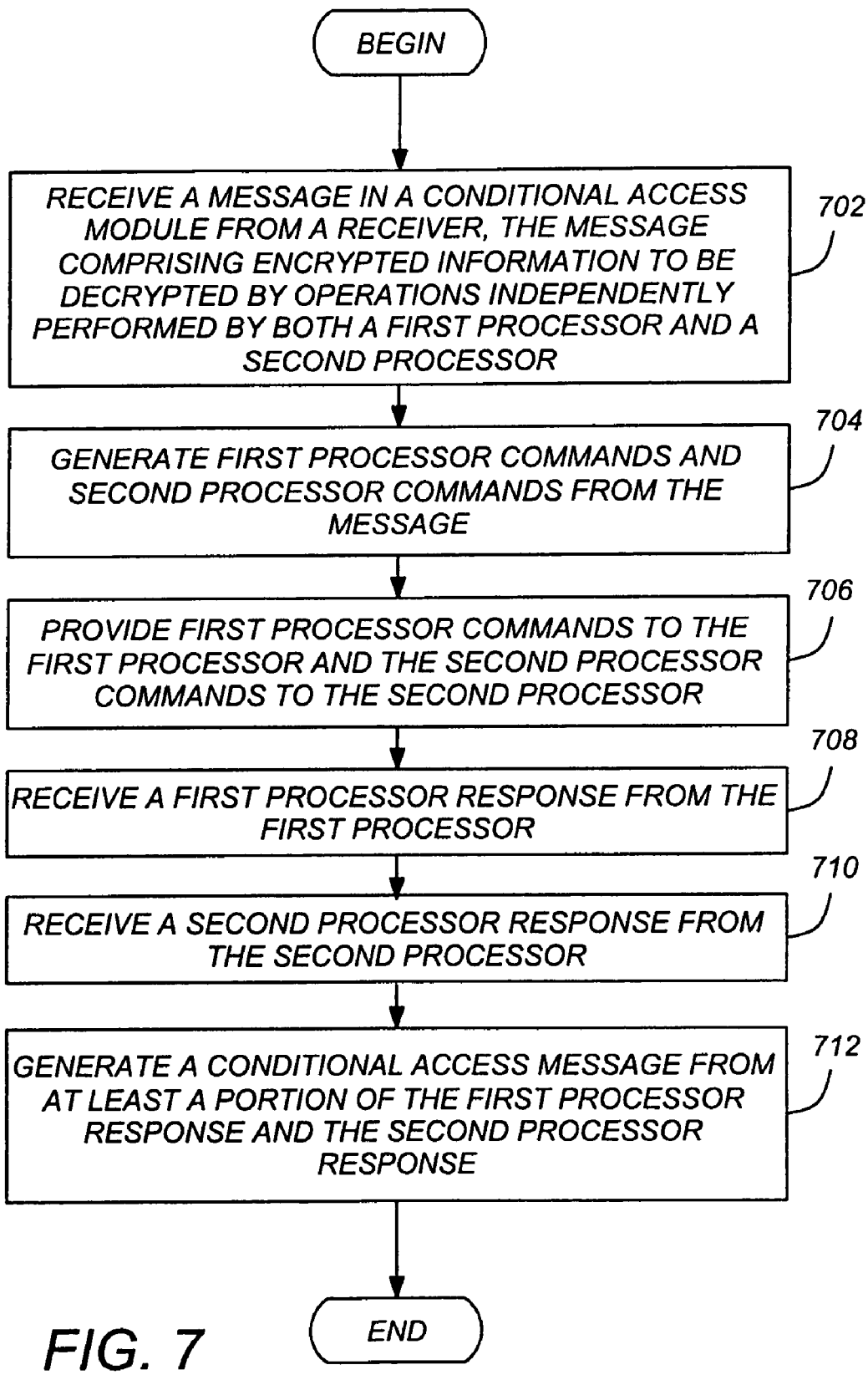
FIG. 7 is a flow chart illustrating exemplary operations used practice the multi-processor embodiments of the present invention.

FIG. 7 is a flow chart illustrating exemplary method steps used to practice another embodiment of the present invention. In block 702, a message is received in a conditional access module 212. The message comprises encrypted information, such as a control word packet that is to be decrypted by operations independently performed by both a first processor 602A and a second processor 602B in the conditional access module 212. The decrypted information is then to be used to provide conditional access to a media program. First processor commands and second processor commands are generated from the message, and provided to the first processor 602A and the second processor 602B, as shown in block 704. The processors 602A and 602B perform the operations implicated by the message received in the conditional access module 212, and report results in the form of responses, which are received from each processor, as shown in blocks 708 and 710. A conditional access message (e.g. decrypted information such as the control word) is then generated at least in part from the first processor response and the second processor response, as shown in block 712, and transmitted to the transport module 208 of the IRD 200 for processing.

CONCLUSION

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching.

For example, the interface module 612 could be an additional microcontroller or hardware state machine. A hardware state machine implementation may be less susceptible to environmental attacks such as voltage, clock, frequency or light induced glitches.

Each microcontroller 602A, 602B may have separate memory access control devices and may implement entirely unique memory access control logic. This forces an intruder to embark on separate attacks to compromise each microcontroller 602A, 602B in the design.

The microcontroller components can employ either a separate physical and logical address range or a single contiguous address range since they are controlled and programmed by the same microcontroller. Either implementation would suffice and would be appropriate as the system designer sees fit.

To further improve security, each microcontroller 602A, 602B may use entirely different software than the other. This is possible as long as each microcontroller 602A, 602B produces the same result for a given input. Having separate code implantations further complicates the attack because the intruder would have to learn how to attack each microcontroller 602A, 602B independently, i.e. knowledge gained from attacking one microcontroller 602 may not be useful in attacking another.

It is possible to share some components such as programming charge pumps and programming control between microcontrollers 602A, 602B. If this is done, care must be taken to ensure that data and address lines of the individual microcontroller components are routed to the appropriate memory access control unit. In this case, independent microcontrollers 602A, 602B cannot provide control information that may lead to a subsequent attack against another independent microcontroller 602A, 602B. Sharing the hardware components may be preferred to ease timing and high voltage requirements of the entire chip, but should be done in a way that does not to compromise the independence of the design.

If a custom logic modules 608A, 608B are used, each processor 602A, 602B may contain different hardware functions built into its custom logic block 608A, 608B. This is possible since each processor 602A, 602B produces a unique partial result for a given input. The use of separate custom logic blocks 608A, 608B for each processor 602A, 602B further complicates the attack because the intruder would have to learn how to attack the custom logic block 608A, 608B of each processor 602A, 602B independently, i.e. knowledge gained from attacking the custom logic block 608A of one processor 602A may not be useful in attacking the other 602B. This significantly increases the level of reverse engineering required to replicate the functionality contained within the CAM 212.

It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A conditional access module, configured to control access to a media program via a receiver communicably coupleable to the conditional access module, comprising:
    a first processor;
    a second processor; and
    an interface module, communicatively coupled to the first processor and the second processor, the interface module configured to process all communications with the conditional access module and to externally manifest a single virtual processor to the receiver;
    wherein the interface module receives messages from the receiver, interprets the received messages, and generates first processor messages for the first processor and second processor messages for the second processor, the first processor messages and the second processor messages defining a functional allocation between the first processor and the second processor and wherein the received messages include encrypted data and the functional allocation is time varied according to the encrypted data;
    wherein the interface module receives a first set of response messages generated by the first processor and a second set of response messages generated by the second processor and generates conditional access response messages using at least a portion of the first set of response messages and at least a portion of the second set of response messages;
    wherein the interpreted messages include encrypted information and wherein the first processor partially decrypts the encrypted information and the second processor further decrypts the partially decrypted information.

2. The apparatus of claim 1, wherein the first processor performs a subset of functions to control access to the media program and the second processor performs a second subset of functions to control access to the media program.

3. The apparatus of claim 1, wherein:
    the first processor is communicatively coupled a first processor memory;
    the second processor is communicatively coupled to a second processor memory; and
    wherein the first processor memory is isolated from the second processor and the second processor memory is isolated from the first processor.

4. The apparatus of claim 1, wherein the interface module comprises:
    a first module configured to receive conditional access module messages; and
    a second module configured to interpret the received messages and configured to generate first processor messages for the first processor and second processor messages for the second processor from the received messages.

5. The apparatus of claim 4, wherein the interface module comprises:
    a third module configured to receive a first set of response messages generated by the first processor and a second set of response messages generated by the second processor; and
    a fourth module configured to generate conditional access module response messages using at least a portion of the first set of response messages and at least a portion of the second set of response messages.

6. The apparatus of claim 1, wherein the interface module is a processor.

7. The apparatus of claim 1, wherein the interface module is a hardware state machine.

8. The apparatus of claim 1, wherein the first processor and the second processor are communicatively coupled to a shared charge pump.

9. The apparatus of claim 1, wherein the first processor and the second processor are communicatively coupled to a shared programming control module, the shared program control module external to the interface module.

10. The apparatus of claim 9, wherein the shared programming control module is configured to synchronize common data stored in the first processor and the second processor.

11. The apparatus of claim 1, wherein the first processor and the second processor each include it's own separate components selected from the group comprising:
    voltage supply;
    clock;
    coprocessor;
    read only memory; and
    random access memory.

12. The apparatus of claim 1, wherein the first processor and the second processor include separate logical address ranges.

13. The apparatus of claim 1, wherein the first processor and the second processor include separate physical address ranges.

14. The apparatus of claim 1, wherein the partially decrypted information is provided from the first processor to the second processor via the interface module.

15. The apparatus of claim 1, wherein the partially decrypted information is provided directly from the first processor to the second processor.

16. The apparatus of claim 1, wherein the first processor and the second processor perform a decryption operation comprising a set of functions that are allocated to the microprocessor or the second microprocessor.

17. The apparatus of claim 16, wherein multiplication functions are assigned to the first processor and addition functions are assigned to the second processor.

18. A method of controlling access to a media program, comprising the steps of:

receiving a message in a conditional access module from a receiver, the message comprising encrypted information to be decrypted by operations independently performed by both a first processor and a second processor in the conditional access module;

generating first processor commands and second processor commands from the message;

providing the first processor commands to the first processor and the second processor commands to the second processor;

receiving a first processor response from the first processor;

receiving a second processor response from the second processor; and generating a conditional access message response from at least a portion of the first processor response and the second processor response;

wherein the media program is encrypted by a control word, the encrypted information is a control word packet, and the conditional access message response is the control word and wherein the first processor messages and the second processor messages define a functional allocation between the first processor and the second processor and wherein the functional allocation is time varying;

wherein the message includes encrypted data and the functional allocation is time varied according to the encrypted data;

wherein the first processor partially decrypts the encrypted information and the second processor further decrypts the partially decrypted information.

19. The method of claim 18, wherein first processor and the second processor operate independently and wherein the step of generating first processor commands and second processor commands from the message comprises the steps of:

alternately directing received messages to the first processor and the second processor.

20. The method of claim 18, wherein the functional allocation is time varied according to a clock received externally from the conditional access module.

21. An apparatus configured to control access to a media program, comprising:

a first processor;

a second processor; and means for receiving a message in a conditional access module from a receiver, the message comprising encrypted information to be decrypted by operations independently performed by both the first processor and the second processor in the conditional access module;

means for generating first processor commands and second processor commands from the message;

means for providing the first processor commands to the first processor and the second processor commands to the second processor;

means for receiving a first processor response from the first processor;

means for receiving a second processor response from the second processor; and means for generating a conditional access message response from at least a portion of the first processor response and the second processor response;

wherein the media program is encrypted by a control word, the encrypted information is a control word packet, and the conditional access message response is the control word and wherein the first processor messages and the second processor messages define a functional allocation between the first processor and the second processor and wherein the functional allocation is time varying;

wherein the message includes encrypted data and the functional allocation is time varied according to the encrypted data;

wherein the first processor partially decrypts the encrypted information and the second processor further decrypts the partially decrypted information.

* * * * *